United States Patent
Han et al.

(10) Patent No.: US 7,047,625 B2
(45) Date of Patent: May 23, 2006

(54) PLANARIZING PROCESS

(75) Inventors: Cherng-Chyi Han, San Jose, CA (US); Mao-Min Chen, San Jose, CA (US); Po Kang Wang, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 119 days.

(21) Appl. No.: 10/647,762

(22) Filed: Aug. 25, 2003

(65) Prior Publication Data

US 2005/0047011 A1  Mar. 3, 2005

(51) Int. Cl.
*G11B 5/127* (2006.01)
*H04R 31/00* (2006.01)

(52) U.S. Cl. ............... 29/603.16; 29/592.1; 29/603.12; 29/603.14; 29/603.15; 29/603.18; 360/121; 360/122; 360/126; 360/317; 427/127; 427/128; 451/4; 451/51

(58) Field of Classification Search ............... 29/592.1, 29/603.12–603.16, 603.18, 829, 831, 851, 29/885; 360/121–126, 317; 427/127, 128; 451/5, 41
See application file for complete search history.

(56) References Cited

U.S. PATENT DOCUMENTS

| 5,779,923 | A  | * | 7/1998  | Krounbi et al. | ............... | 216/22 |
| 6,317,288 | B1 |   | 11/2001 | Sasaki         | ............... | 360/126 |
| 6,339,523 | B1 |   | 1/2002  | Santini        | ............... | 360/317 |
| 6,396,660 | B1 |   | 5/2002  | Jensen et al.  | ............... | 360/126 |
| 6,466,401 | B1 |   | 10/2002 | Hong et al.    | ............... | 360/123 |
| 6,466,404 | B1 |   | 10/2002 | Crue, Jr. et al. | ............. | 360/126 |
| 6,687,083 | B1 | * | 2/2004  | Hsiao et al.   | ............... | 360/126 |
| 6,693,769 | B1 | * | 2/2004  | Hsu et al.     | ............... | 360/317 |
| 2005/0024769 | A1 | * | 2/2005 | Han et al.    | ............... | 360/126 |

FOREIGN PATENT DOCUMENTS

JP  01256107 A  * 10/1989

OTHER PUBLICATIONS

"Design and performance of a recessed thin film inductive transducer"; Zak, B.S.; Curland, N.; Giusti, J.H.; Ash, K.P.; Cameron, G.P.; Magnetics, IEEE Transactions on vol. 32, Issue 1, Jan. 1996; pp.: 74-79.*

* cited by examiner

*Primary Examiner*—Paul D. Kim
(74) *Attorney, Agent, or Firm*—Saile Ackerman LLC; Stephen B. Ackerman (57) ABSTRACT

Present processes used for planarizing a cavity filled with a coil and hard baked photoresist require that a significant amount of the thickness of the coils be removed. This increases the DC resistance of the coil. In the present invention, cavity and coil are overfilled with photoresist which is then hard baked. A layer of alumina is then deposited onto the surface of the excess photoresist, following which CMP is initiated. The presence of the alumina serves to stabilize the photoresist so that it does not delaminate. CMP is terminated as soon as the coils are exposed, allowing their full thickness to be retained and resulting in minimum DC resistance.

8 Claims, 9 Drawing Sheets

PLANARIZING PROCESS

This invention is related to application Ser. No. 10/633,105 filed Aug. 1, 2003

FIELD OF THE INVENTION

The invention relates to the general field of magnetic disks with particular reference to write heads for very narrow tracks.

BACKGROUND OF THE INVENTION

For high data rate writer application, one of the requirements is to have fast saturation and low inductance to induce short rise time. On the other hand, a low fly height for high areal density recording beyond 60 GB is needed in order to have better head performance. Many reliability problems are, however, associated with this low fly height. Problems such as thermal pole tip protrusion induced by thermal mismatch between alumina and pole materials during the writing process will create a head-disk interface problem and eventually will damage the read head. One of the solutions to reducing thermal pole tip protrusion is to reduce DC coil resistance of the writer so that less heat is generated during the writing process. Additionally, lower DC coil resistance improves the coil's thermal reliability.

Figure 1:
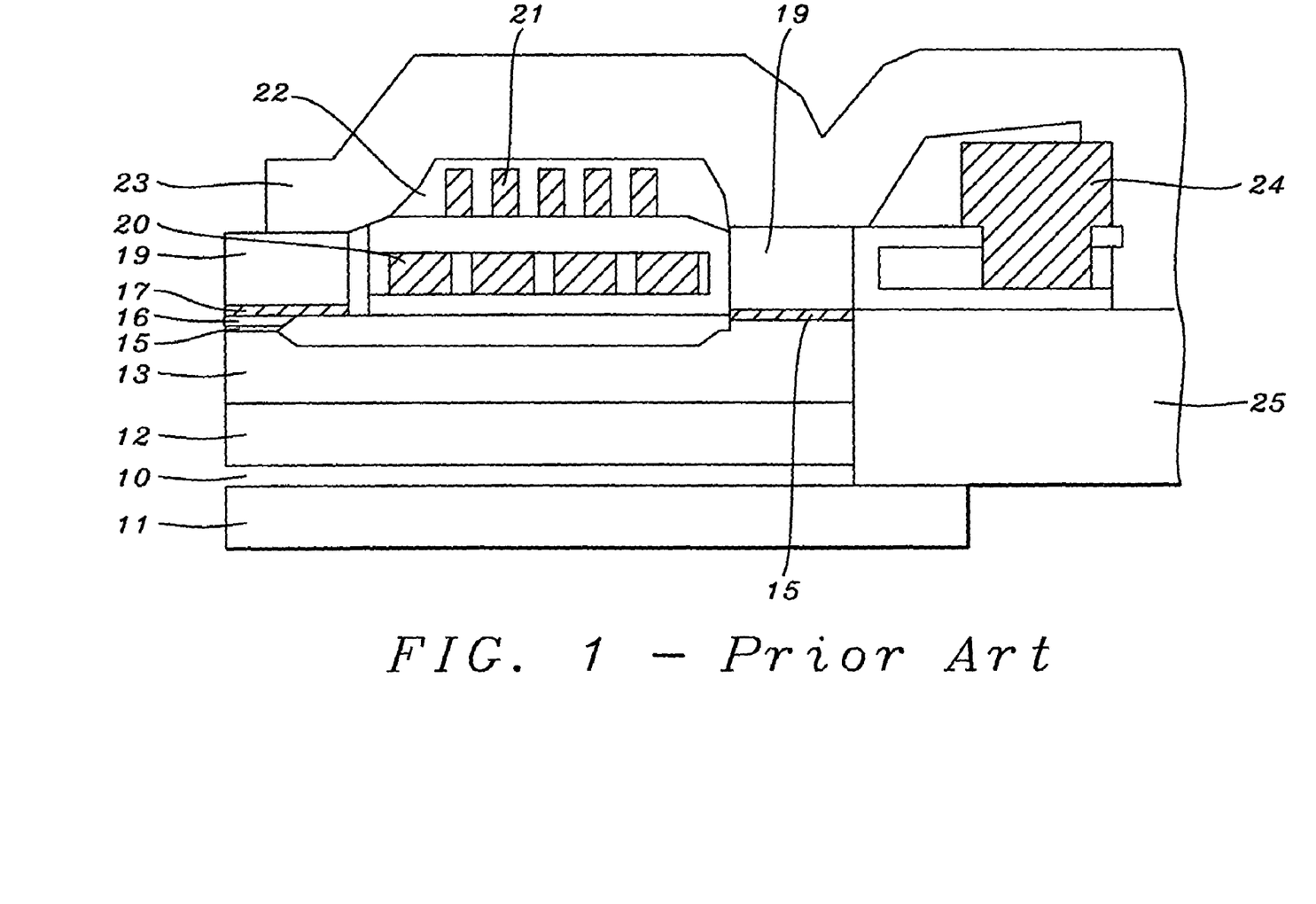
FIG. 1 is a cross-sectional view of a stitched pole magnetic write head of the prior art showing how the thickness of the lower coil is limited.

FIG. 1 is a schematic cross-section through a typical stitched writer design having two coil layers. Seen in FIG. 1 are GMR read head 10, read head lower shield 11, read head upper shield 12, write head bottom pole 13 (P1), lower coil insulation 14, seed layers 15 and 17, write gap 16, stitched top pole 19, lower coil 20, upper coil 21, upper coil insulation 22, top pole 23, coil lead 24, and alumina layer 25

The main drawback of this 2 layer coil stitched writer structure is its high DC coil resistance. This is a result of the prior art processes used for its manufacture. In particular, because of the small size and internal spacings of the coils, the preferred material for enclosing and electrically isolating the coils has been hard baked photoresist. This material is well suited to filling in tiny openings and is soft enough to accommodate volume changes in the coils due to thermal expansion while they are operating at maximum power. Present processes used for planarizing a cavity filled with a coil and hard baked photoresist require that a significant amount of the thickness of the coils be removed. This, in turn, increases the DC resistance of a given coil having a given number of turns leading to a degradation of its performance.

In this invention, we describe a novel two layer coil structure with low DC coil resistance for short yoke length stitched writer.

A routine search of the prior art was performed with the following references of interest being found:

In U.S. Pat. No. 6,317,288, Sasaki describes a device having two coils while in U.S. Pat. No. 6,466,404, Crue Jr. et al disclose a device having a coil embedded in the first pole. U.S. Pat. No. 6,396,660 (Jenson et al) shows a device wherein a coil is situated atop a heat sink and in U.S. Pat. No. 6,339,523 Santini teaches a device having two coils, but the coils are not aligned. Hong et al show, in U.S. Pat. No. 6,466,401, a device having interlaced coils.

SUMMARY OF THE INVENTION

It has been an object of at least one embodiment of the present invention to provide a magnetic write head.

Another object of at least one embodiment of the present invention has been that said write head be driven by a write coil having a DC resistance less than about 5 ohms for a minimum of 9 turns.

Still another object of at least one embodiment of the present invention has been to provide a process for manufacturing said coil and write head.

These objects have been achieved by using a modified CMP process for forming and encapsulating the write coil. After formation of the coil on the floor of a suitable cavity, the cavity and coil are overfilled with photoresist which is then hard baked. A layer of alumina is then deposited onto the surface of the excess photoresist, following which CMP is initiated. The presence of the alumina serves to stabilize the photoresist so that it does not delaminate. CMP is terminated as soon as the coils are exposed, allowing their full thickness to be retained, resulting in minimum DC resistance.

DESCRIPTION OF THE PREFERRED EMBODIMENTS

We will now describe a process to manufacture a coil feed-through design in which the coil DCR (DC resistance) is reduced in comparison to current LP (low profile) stitched writers.

Figure 2:
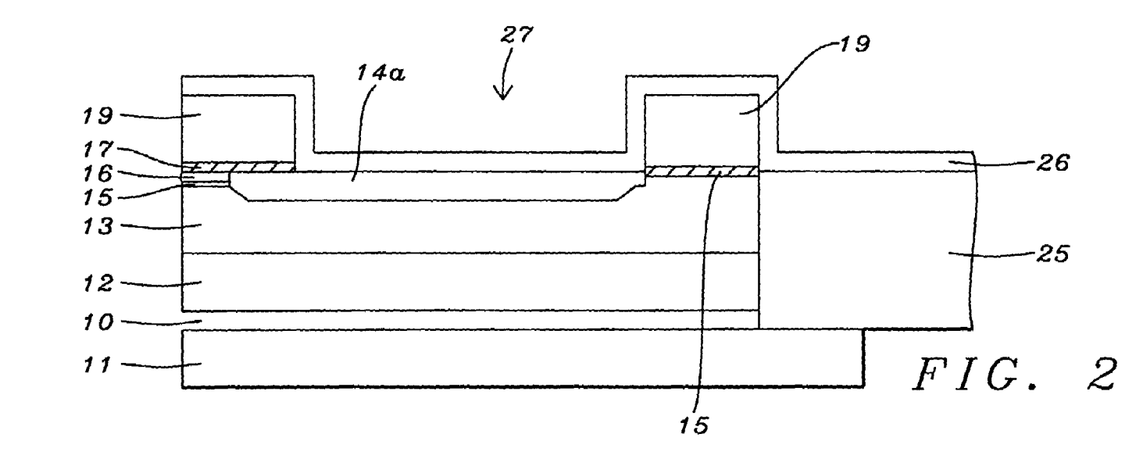
FIG. 2 shows the starting point for the process of the present invention.

Referring now to FIG. 2, the process of the present invention begins with the provision of a substrate (normally a completed GMR read head, including top and bottom shields) onto which is deposited bottom pole layer 13, typically a material such as CoFe, CoNiFe, or NiFe between about 1 and 3 microns thick. Layer 15 of high permeability material such as CoFeN or CoFe is deposited onto layer 13 to a thickness between about 0.1 and 0.5 microns. This is followed by the etching of a shallow trench having sloping sides that extends through layer 15 into layer 13 for a total depth of between about 0.1 and 0.5 microns, said depth being carefully controlled since this will determine the width of the throat of the device.

The trench in layer 13 is then overfilled with insulating material 14a and planarized so as to be coplanar with 15. Following the deposition and patterning of layers 16 and 17 (write gap and flux concentrator respectively), stitched pole layer 19 is deposited to a thickness between about 1 and 2 microns and cavity 27 is etched therein to define the coil housing area. This cavity has a depth between about 2 and 3 microns, a width between about 20 and 60 microns, and a length between about 6 and 10 microns. After the deposition of protective insulating layer 26 over the entire upper surface the structure has the appearance seen in FIG. 2.

Figure 3:
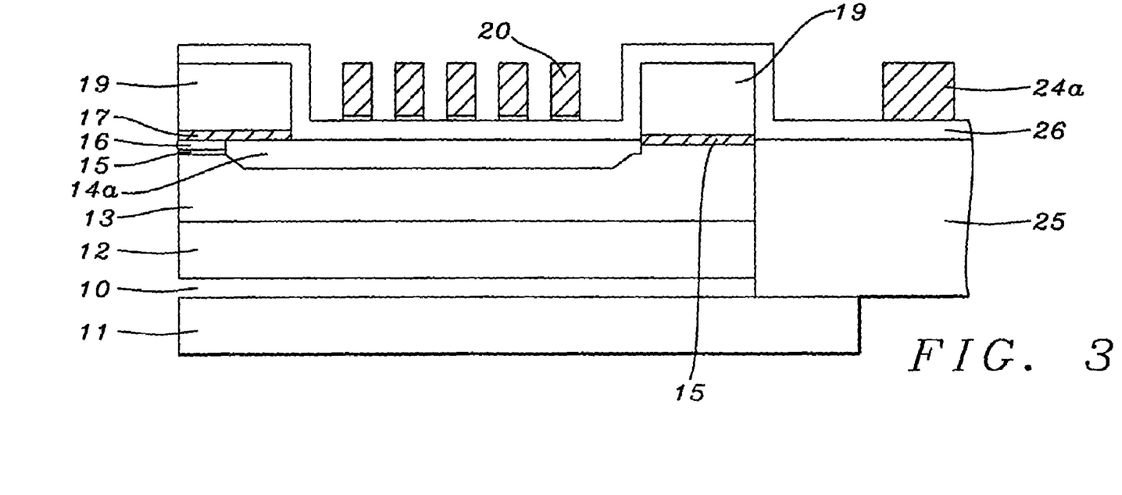
FIG. 3 illustrates formation of the lower coil.

Referring now to FIG. 3, lower coil 20 and connecting terminal 24a are formed using conventional methods—after deposition of a conductive seed layer (generally a laminate of copper on titanium) over layer 26, the coil shape was defined through a photoresist pattern and built up by electroplating copper to a thickness between about 1.5 and 2.5 microns onto all areas not covered by the resist, following which the resist was stripped and all areas of the seed layer not covered by copper were selectively etched away, giving the structure the appearance illustrated in FIG. 3.

Figure 4:
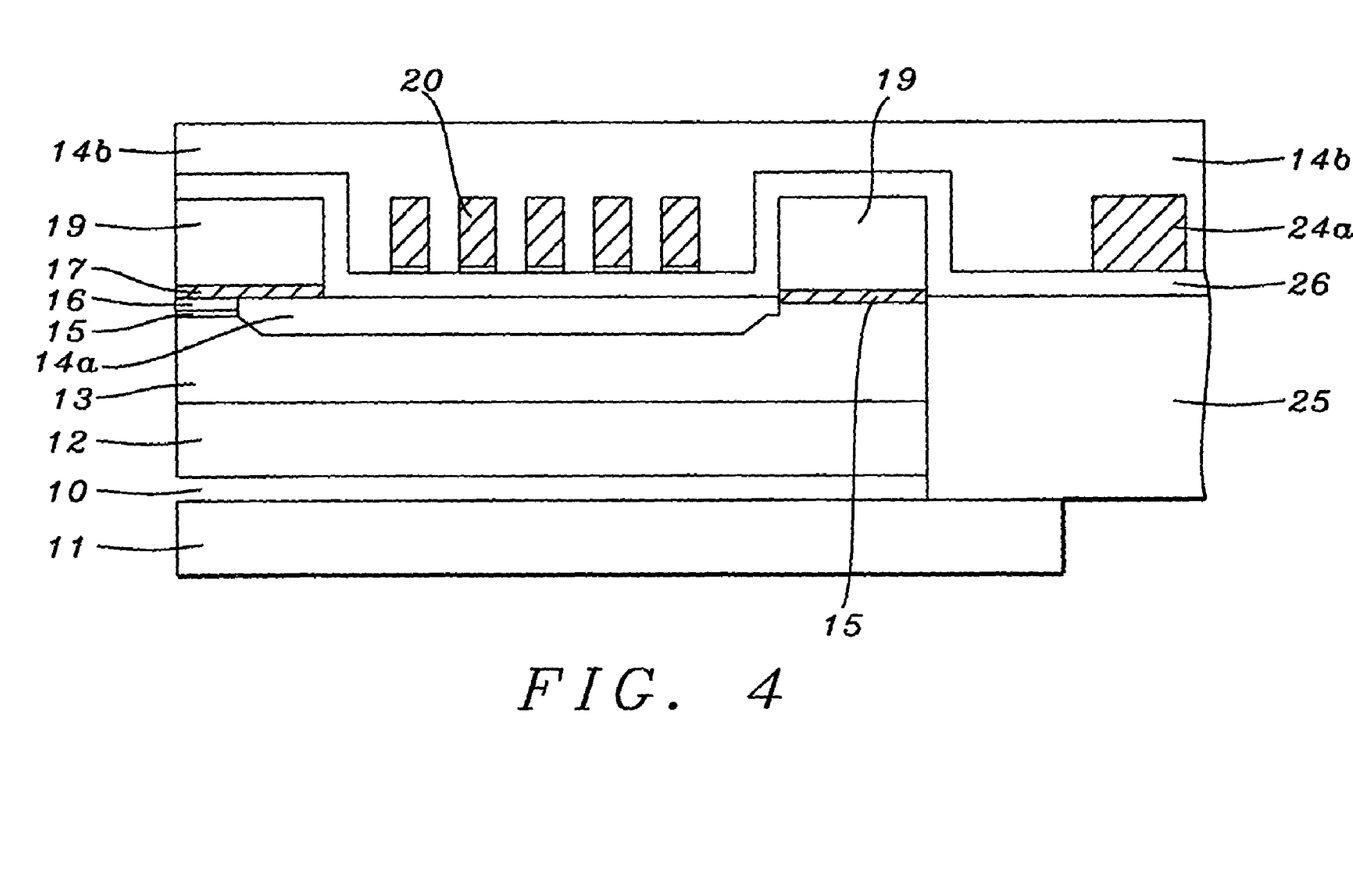
FIGS. 4–6 show the novel sub-process used for encapsulating and planarizing the lower coil.

Referring next to FIG. 4, insulating layer 14b of photoresist is applied (preferably, but not mandatorily, by spin coating) and then in nitrogen hard baked between about 150 and 250° C. for between about 1 and 5 hours. A key feature of the invention is that layer 14b is thick enough so that, after the baking process and planarization, its thickness is sufficient for there to be between about 1 and 2 microns of it extending above the tops of the copper coils 20. Layer 14b must not be allowed to be part of the head's ABS (air bearing surface) since hard-baked photoresist is incompatible with the slider process under which the ABS operates.

Figure 5:
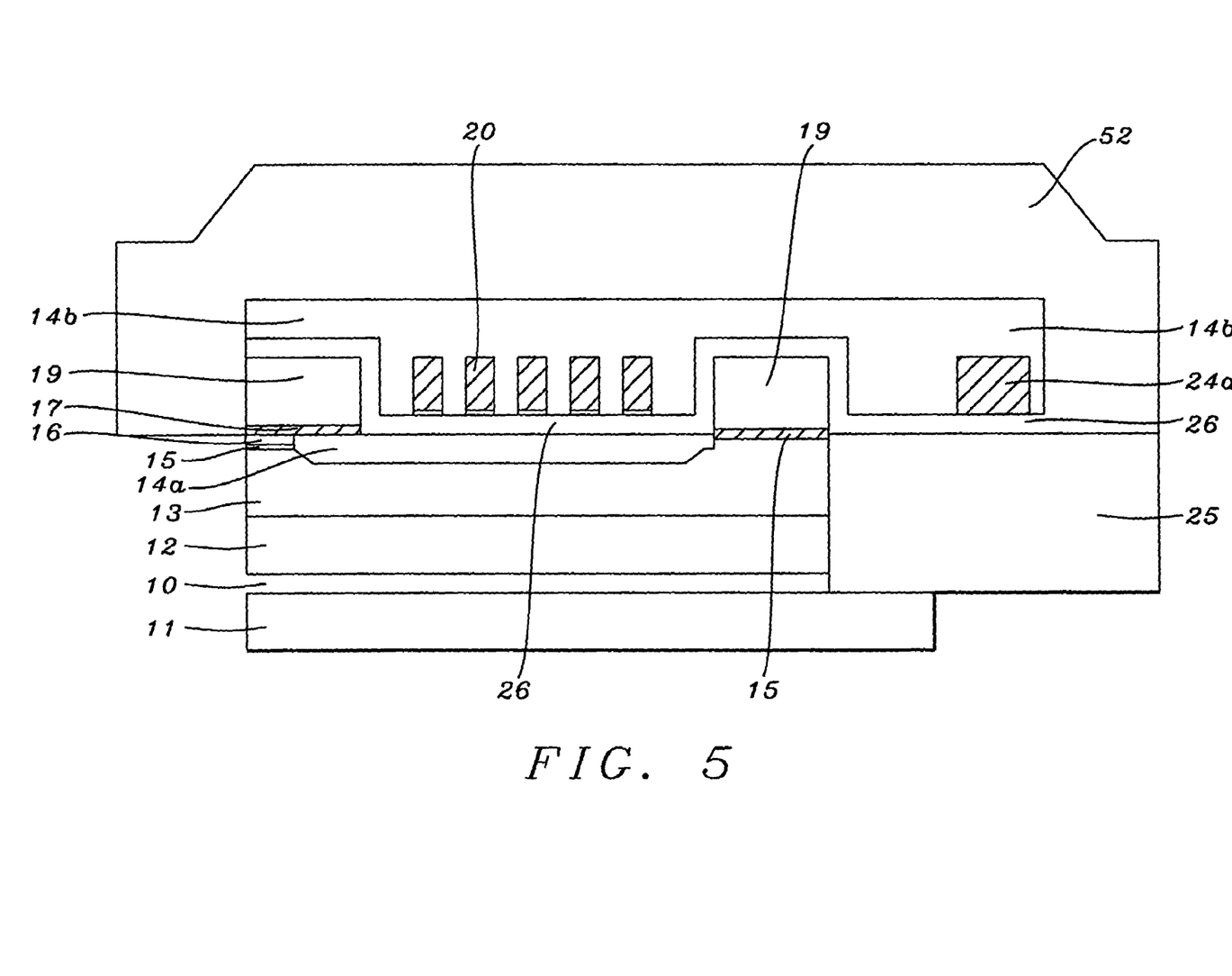
Figure 6:
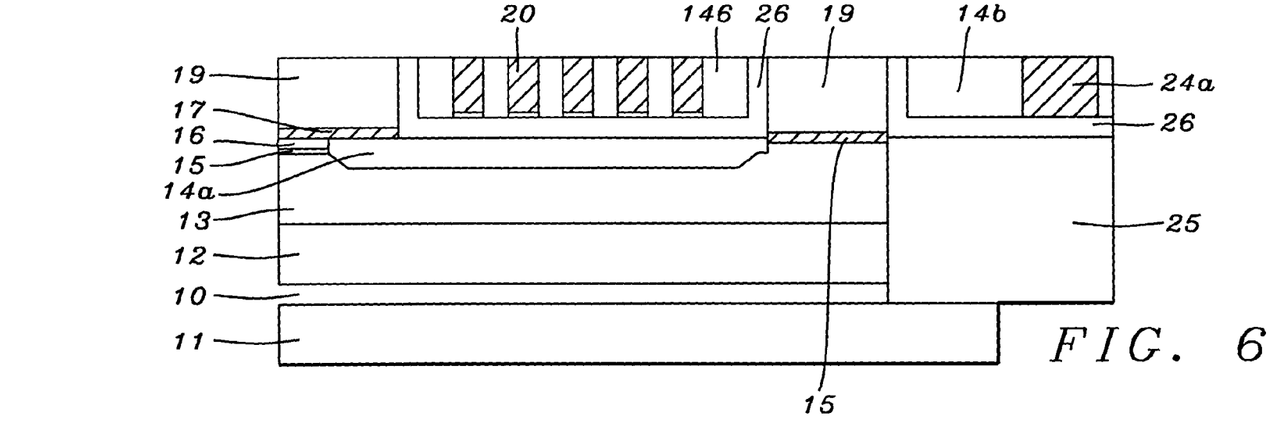

Now follows another key feature of the invention. As shown in FIG. 5, the entire structure is covered by alumina layer 52, which is between about 5 and 6 microns thick and which is deposited by sputtering. This is followed by planarization down to the level of lower coil 20. The presence of layer 52 during the final stages of the planarization process serves to stabilize the baked photoresist of layer 14b so that it does not delaminate as the top surface of coil 20 is approached. This makes it possible to terminate planarization as soon as the coil is exposed, the end result being as illustrated in FIG. 6.

It is important to note that, at the conclusion of the process steps that have just been described, coil 20 has a DC resistance that is less than about 3 ohms (and has at least 5 turns). This is possible because the process steps that have been outlined immediately above allow a planarization process based on CMP (chemical mechanical polishing) to be executed without any reduction in the thickness of the coil.

Figure 7:
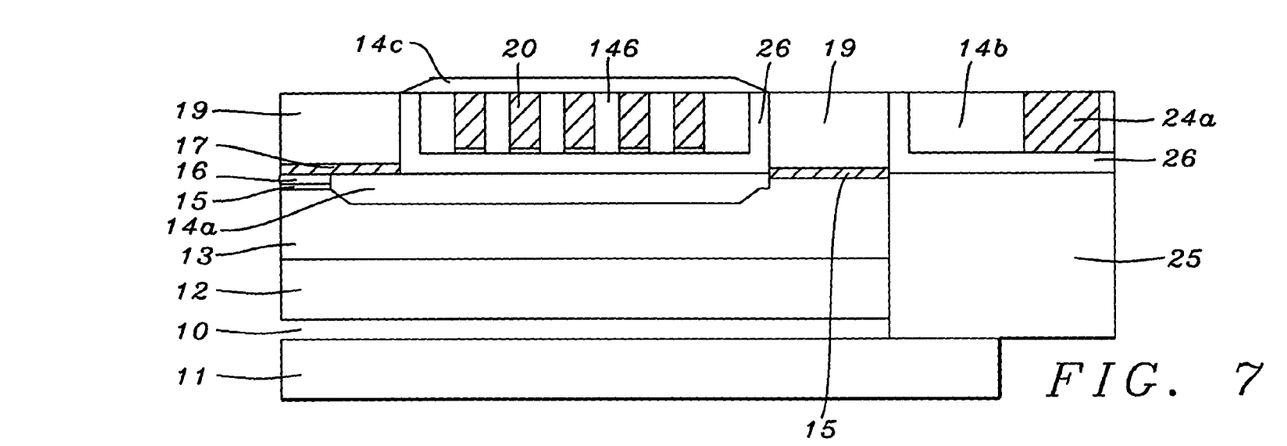
FIGS. 7–9 illustrate the sub-process for forming and encapsulating the upper coil.
Figure 8:
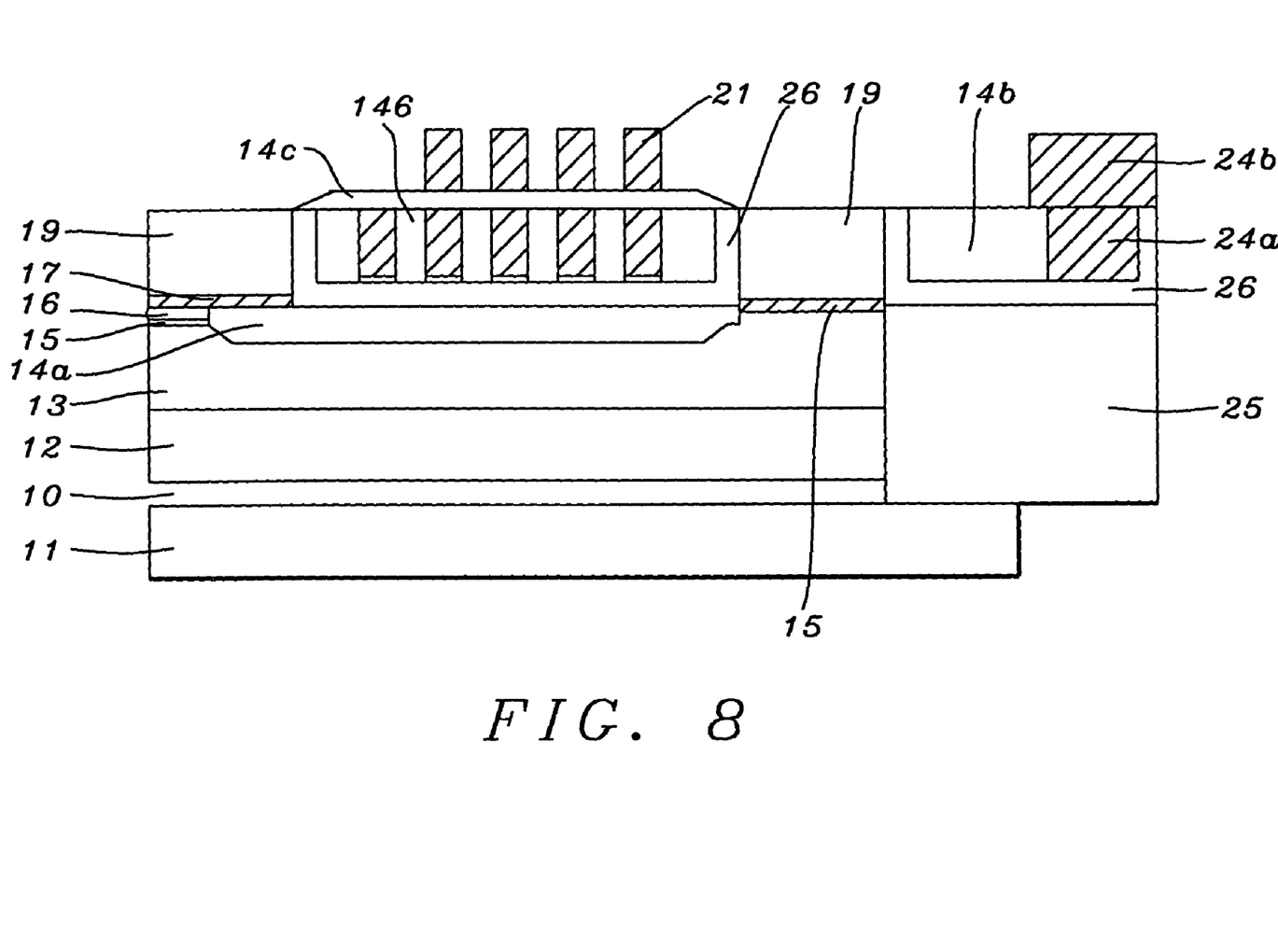

Referring next to FIG. 7, insulating layer 14c is laid down and patterned so that it just fits over the original cavity 27, forming a lid. Top coil 21 is then formed on the surface of 14c in same way as was bottom coil 20. At the same time top coil connecting terminal 24b is formed and is direct contact with lower coil terminal 24a thereby ensuring that coils 20 and 21 are in parallel.

Figure 9:
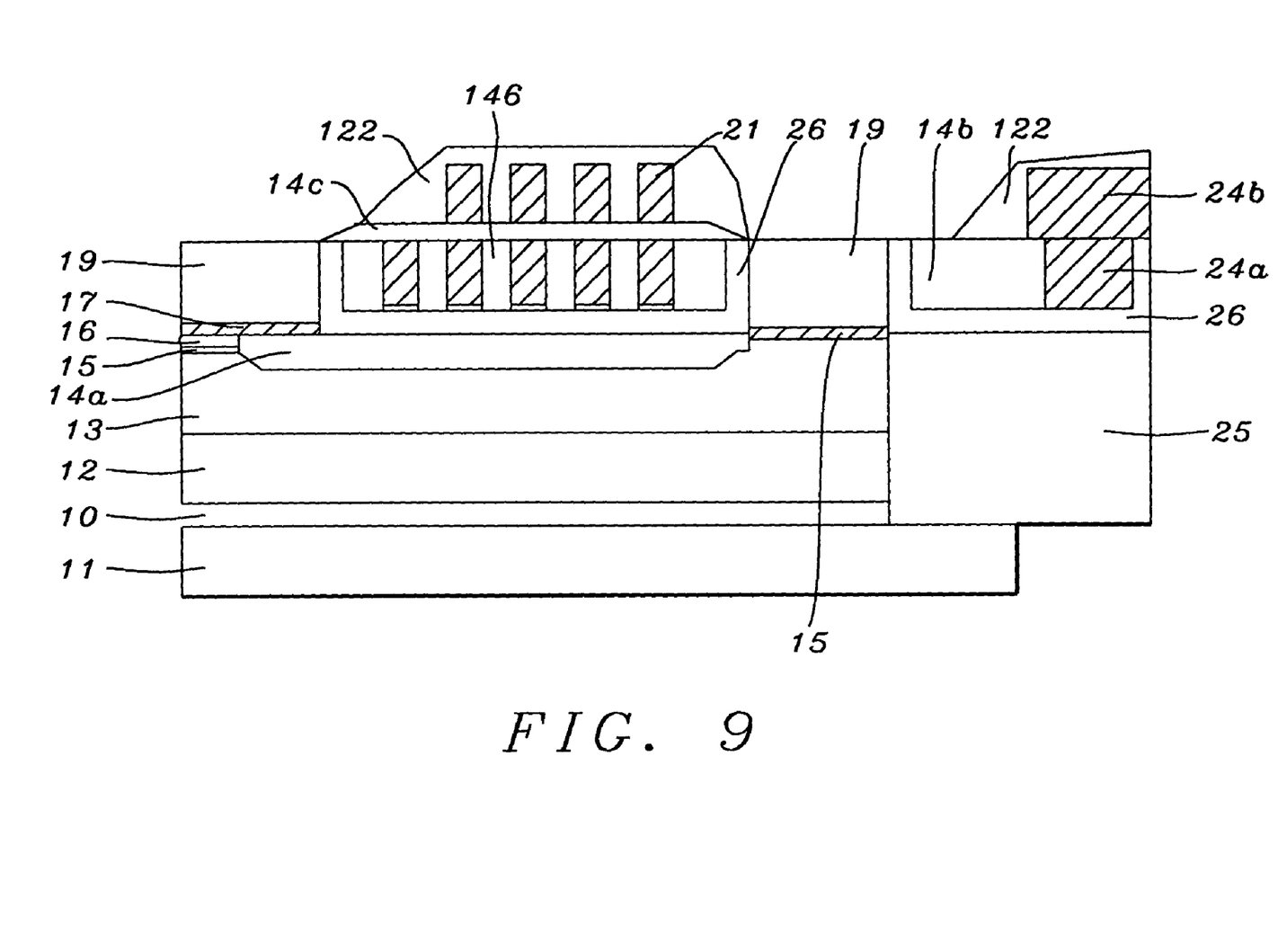
Figure 10:
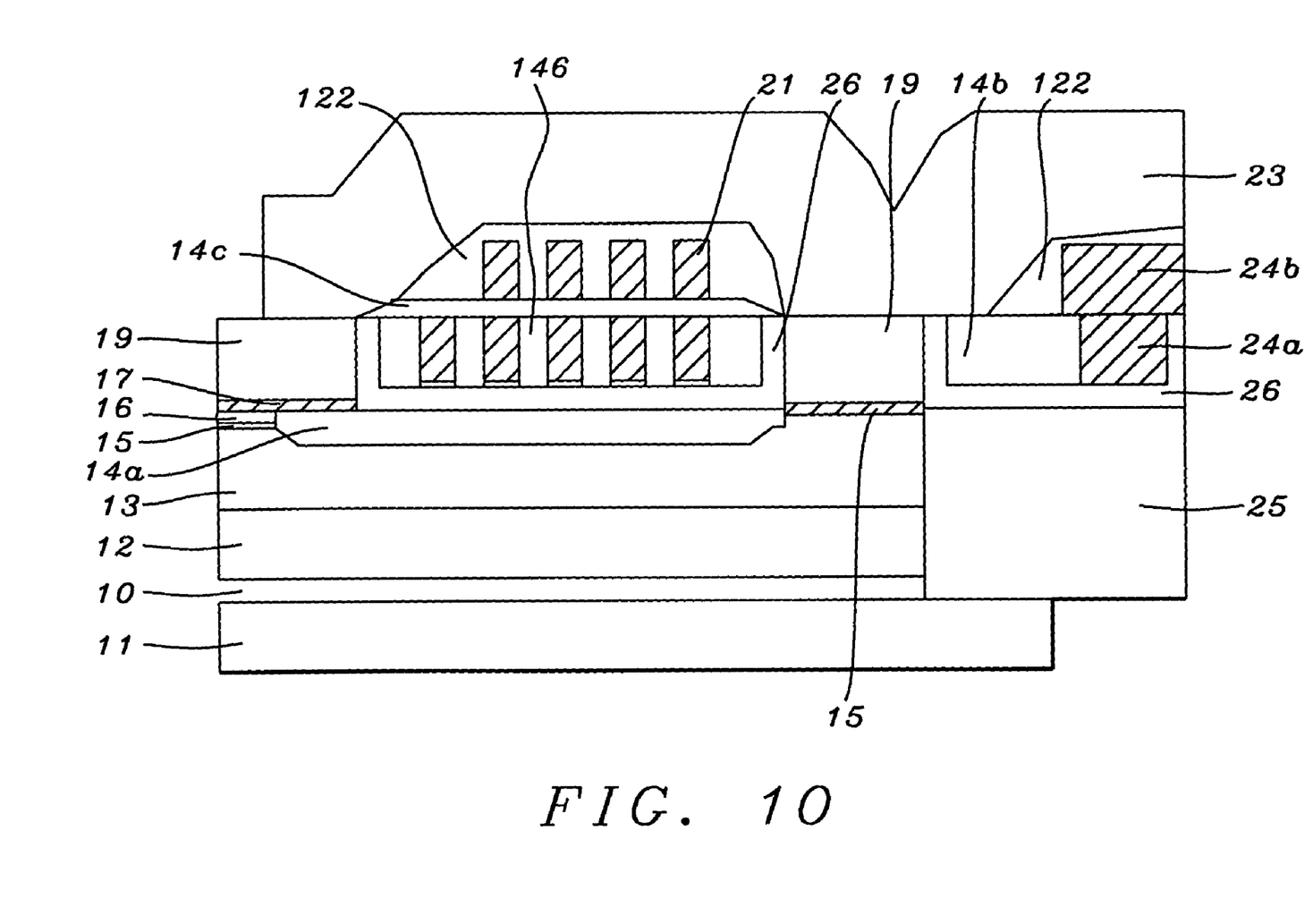
FIG. 10 schematically shows the end product of the process of the present invention.

Then, as seen in FIG. 9, a second layer of hard baked photoresist 122 is applied and patterned so as to cover the upper coils and their terminals while leaving stitched pole 19 exposed. Formation of the structure is completed with the deposition of top pole layer 23 which is in contact with layer 19 as shown in FIG. 10

Figure 11:
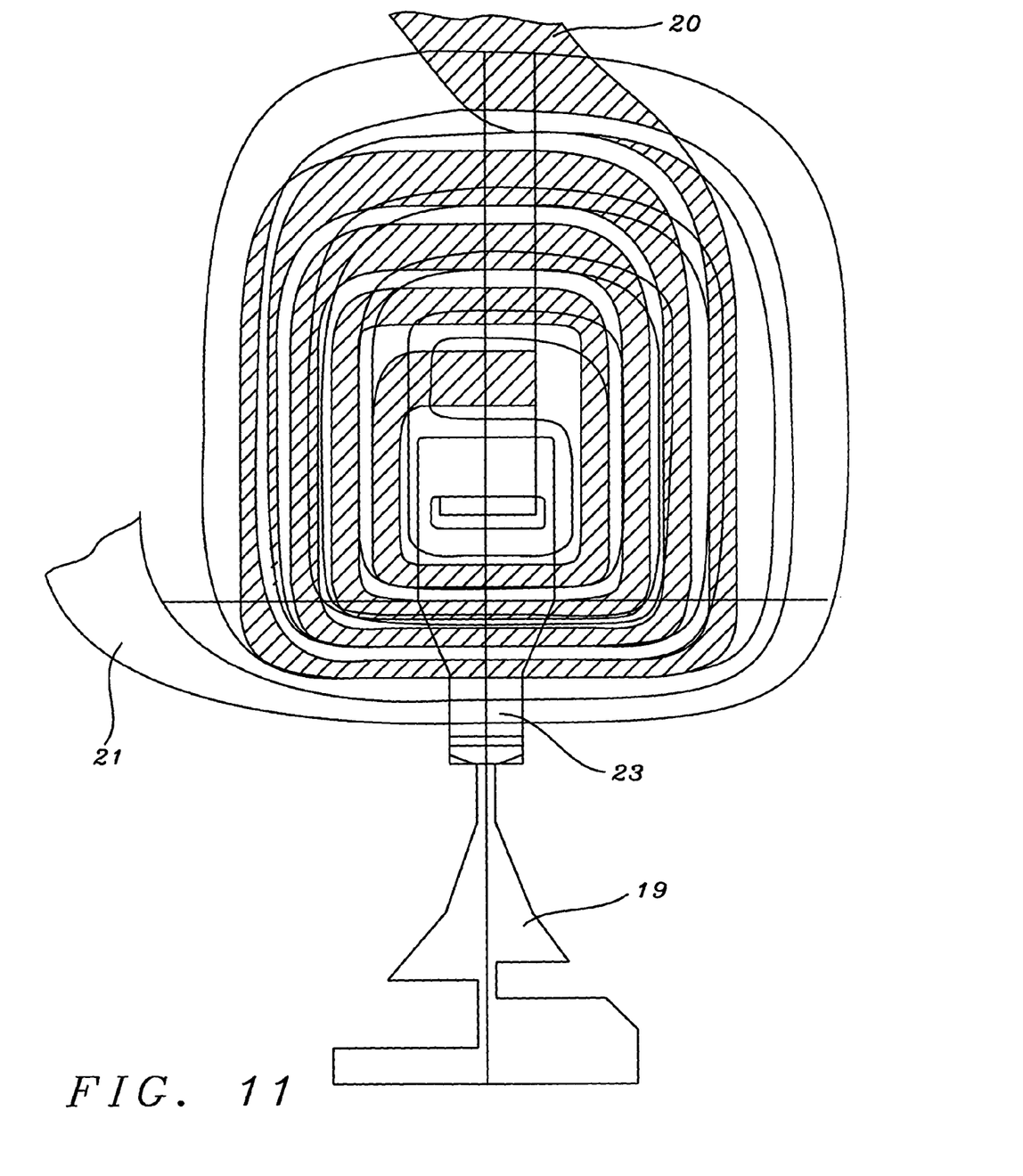
FIG. 11 is an plan view to scale of the cross section seen in FIG. 10

FIG. 11 is a plan view of the completed structure.

What is claimed is:

1. A planarizing process comprising:
   providing a first layer of a material having an upper surface;
   etching in said first layer a cavity having a floor;
   forming on said cavity floor a copper coil, having at least 5 turns and a DC resistance that is less than about 3 ohms;
   applying a layer of photoresist to a thickness that is more than sufficient to cover said coil;
   hard baking said layer of photoresist and then planarizing so that between about 1.5 and 2 microns of remaining hard baked photoresist extends above said upper surface;
   coating said layer of baked photoresist with a layer of alumina; and
   then planarizing by means of chemical mechanical polishing until said coil is just exposed and no photoresist remains on said upper surface, said layer of alumina serving to stabilize said baked photoresist layer whereby said baked photoresist layer does not delaminate as said upper surface is approached and termination of planarization is facilitated.

2. The process recited in claim 1 wherein said cavity has a depth between about 2 and 3 microns.

3. The process recited in claim 1 wherein said cavity has a width between about 20 and 60 microns and a length between about 6 and 10 microns.

4. The process recited in claim 1 wherein the step of forming a copper coil further comprises:
   depositing a conductive seed layer;
   defining a location and shape for said coil by means of a photoresist pattern and then electroplating copper to a thickness between about 1.5 and 2.5 microns onto all areas not covered by said photoresist;
   stripping away all photoresist; and
   then removing all areas of the seed layer that are not covered by copper.

5. The process recited in claim 1 wherein the step of applying a layer of photoresist further comprises use of spin coating.

6. The process recited in claim 1 wherein the step of hard baking said layer of photoresist further comprises baking in nitrogen for between about 150 and 250° C. for between about 1 to 5 hours.

7. The process recited in claim 1 wherein said layer of alumina is deposited to a thickness between about 5 and 6 microns.

8. The process recited in claim 1 wherein said layer of alumina is deposited by means of sputtering.

* * * * *